(No Model.) 4 Sheets—Sheet 1.

G. F. SCHILD
CAISSON GATE.

No. 287,178. Patented Oct. 23, 1883.

Witnesses:

Inventor,
Geo. F. Schild
By Dewey & Co.
Attorneys (No Model.)
4 Sheets—Sheet 2.
G. F. SCHILD.
CAISSON GATE.
No 287,178. Patented Oct. 23, 1883.
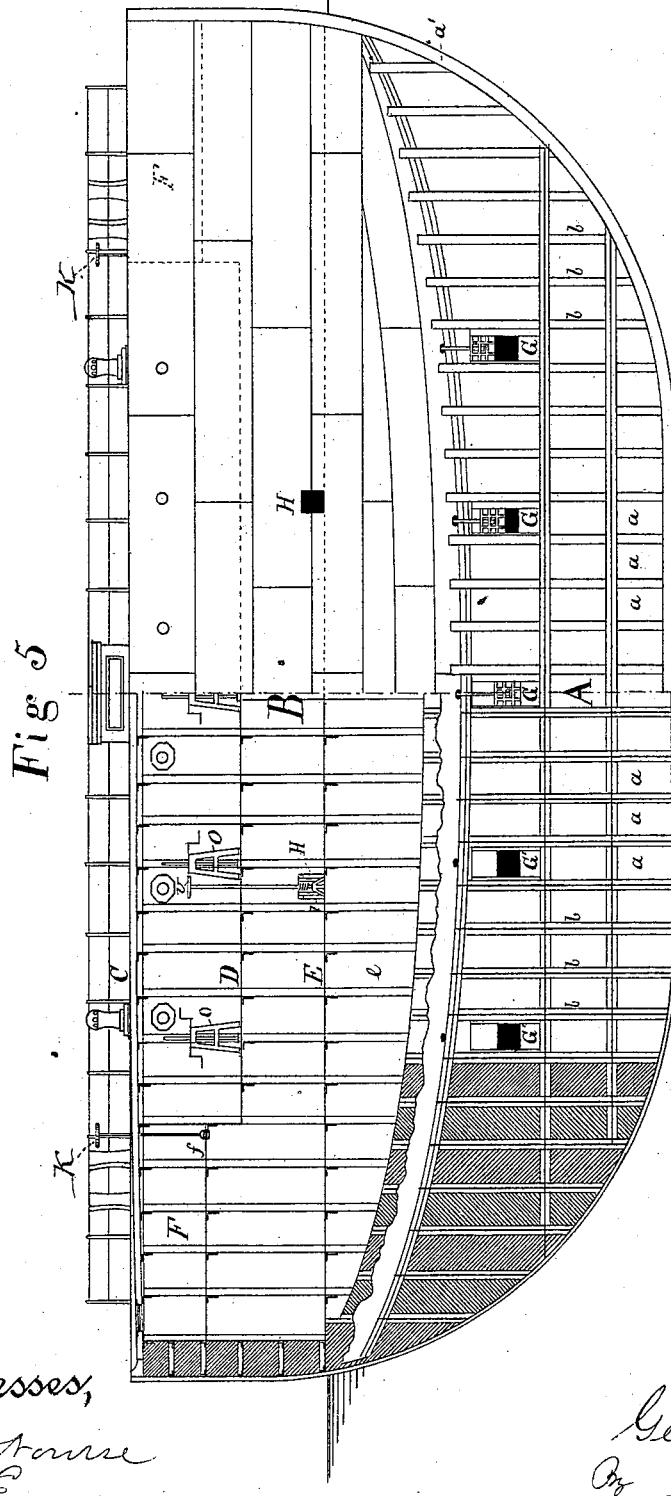
Witnesses,
Inventor,
Geo. F. Schild
By Dewey & Co
Attorneys

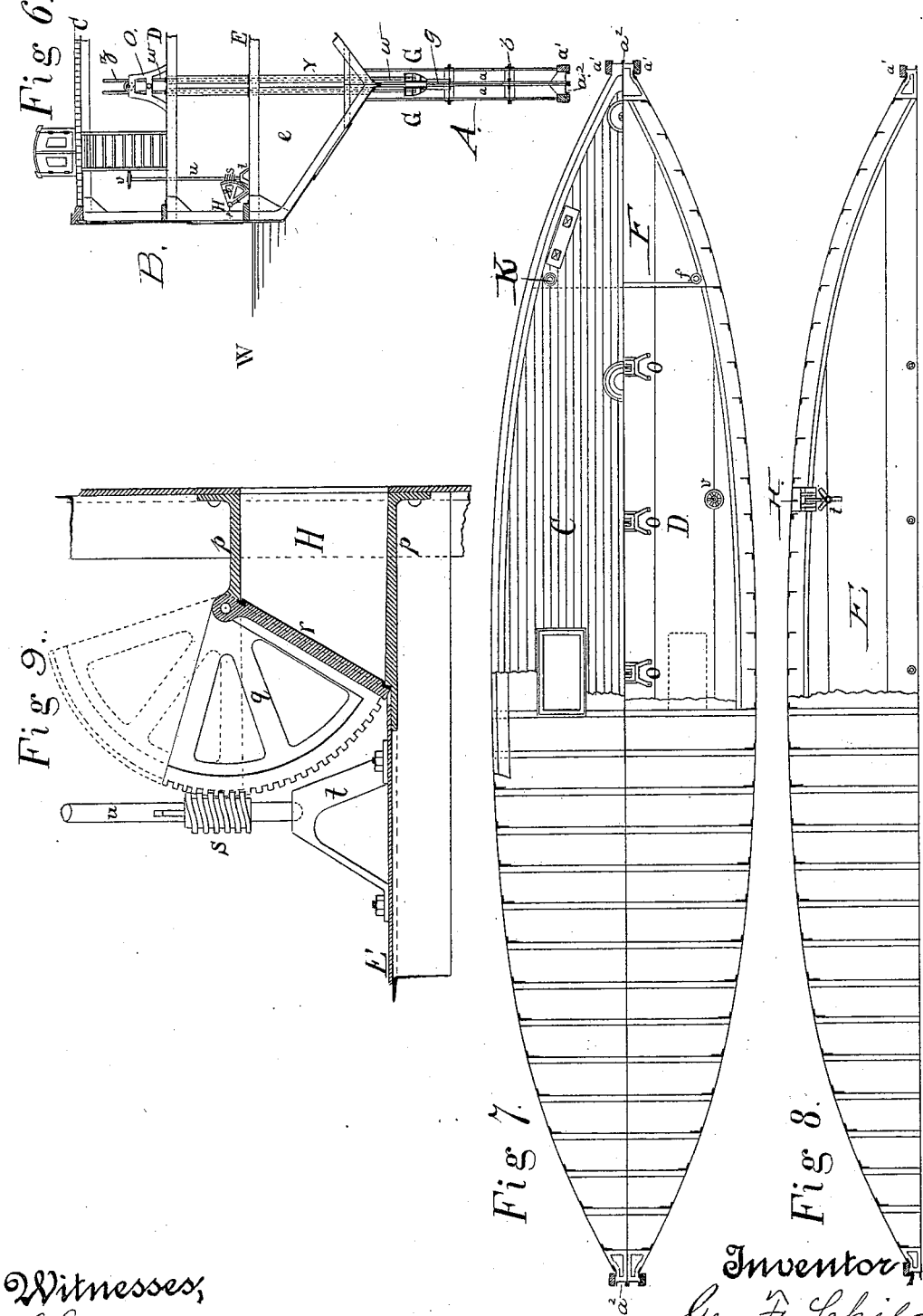

(No Model.) 4 Sheets—Sheet 4.
G. F. SCHILD.
CAISSON GATE.
No. 287,178. Patented Oct. 23, 1883.
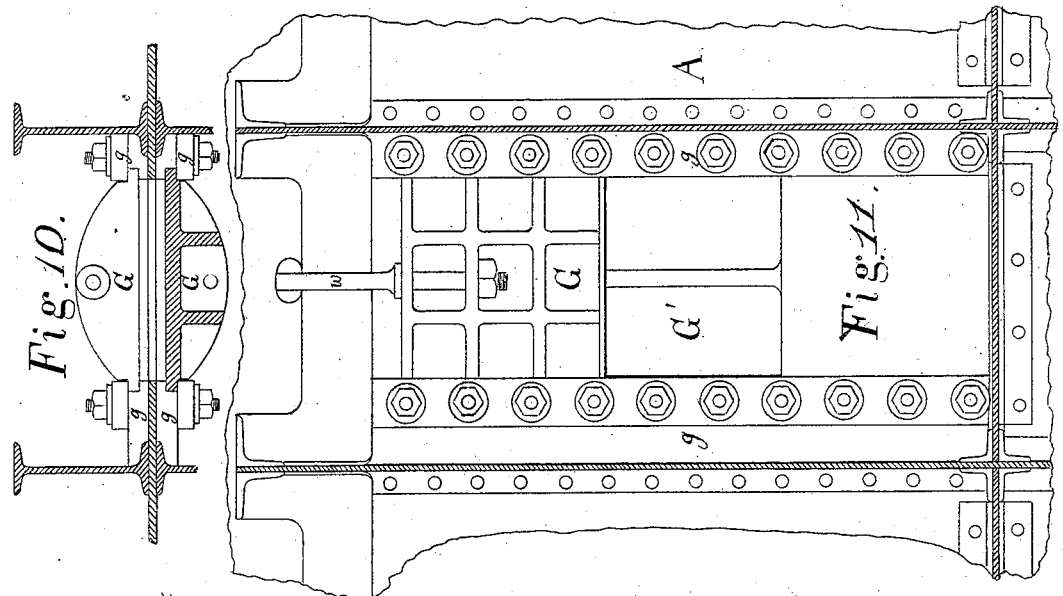
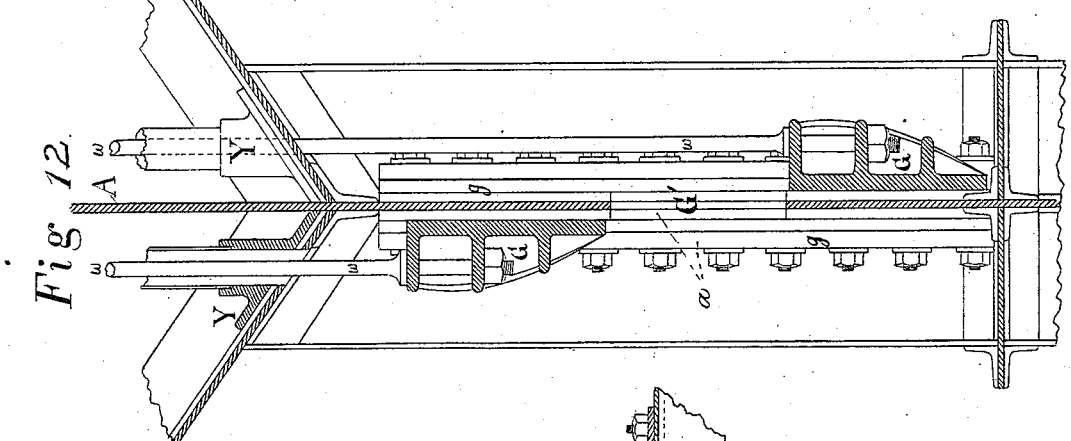
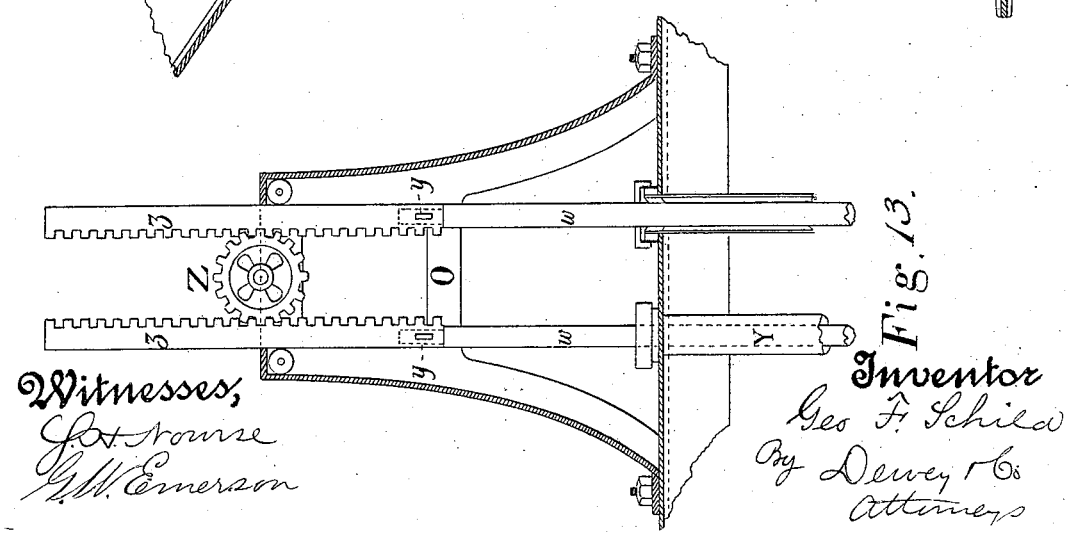
Witnesses,
G. H. Nourse
G. W. Emerson
Inventor
Geo. F. Schild
By Dewey & Co.
Attorneys

UNITED STATES PATENT OFFICE.

GEORGE F. SCHILD, OF VALLEJO, CALIFORNIA.

CAISSON-GATE.

SPECIFICATION forming part of Letters Patent No. 287,178, dated October 23, 1883.

Application filed March 31, 1883. (No model.)

*To all whom it may concern:*

Be it known that I, GEORGE F. SCHILD, of Vallejo, county of Solano, State of California, have invented an Improvement in Caisson-Gates; and I hereby declare the following to be a full, clear, and exact description thereof.

My invention relates to an improved caisson or floating gate for harbors, canals, river-locks, deep-water basins, and the different kinds of dry-docks.

My invention consists in a gate formed of a plate shaped like and adapted to fit the entrance of the locks, harbors, or docks; in a peculiar boat-like structure or buoy connected with it to keep it afloat and upright, and in means for sinking or floating said gate and buoy, consisting of certain water-tanks and peculiar valves, all of which will hereinafter fully appear.

The gates which are ordinarily used consist of two leaves swinging on pivots below and in straps above water. A great amount of mechanical force is required to operate them. This causes constant wear and tear of the gates, as well as of the side walls and the bottoms of the chambers. Repairs, as a consequence, are very costly and make necessary the use of coffer-dams. The caisson-gates which are generally used are boat-like floating structures the keel and stems of which fit into grooves at the entrance of harbors and docks, and prevent the water from flowing either in or out. These caisson-gates, built of either wood or iron, are very heavy and clumsy, requiring a great amount of stationary ballast to keep them in an upright position and pumps to operate them.

The object of my invention is to provide a floating gate or caisson-gate which will be light and easily handled, requiring no stationary ballast to lower it and keep it steady, and no pumps to raise it.

Figure 2:
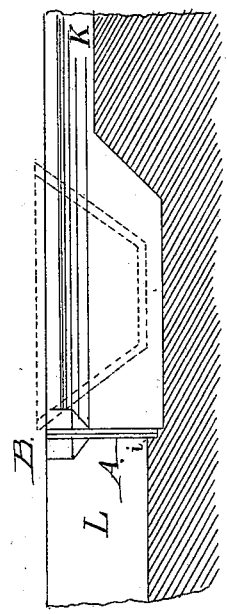
Figure 4:
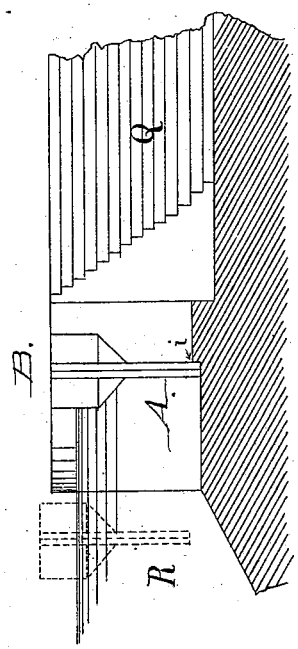
Figure 1:
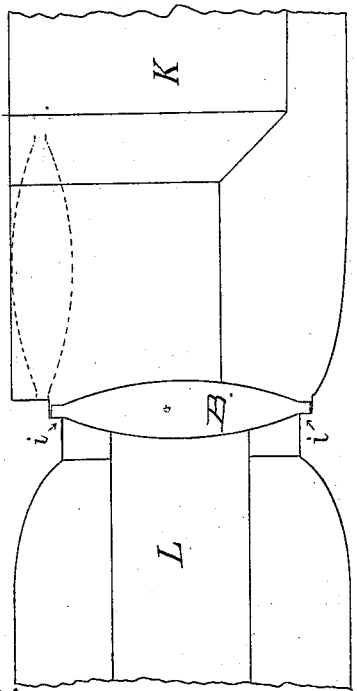
Figure 3:
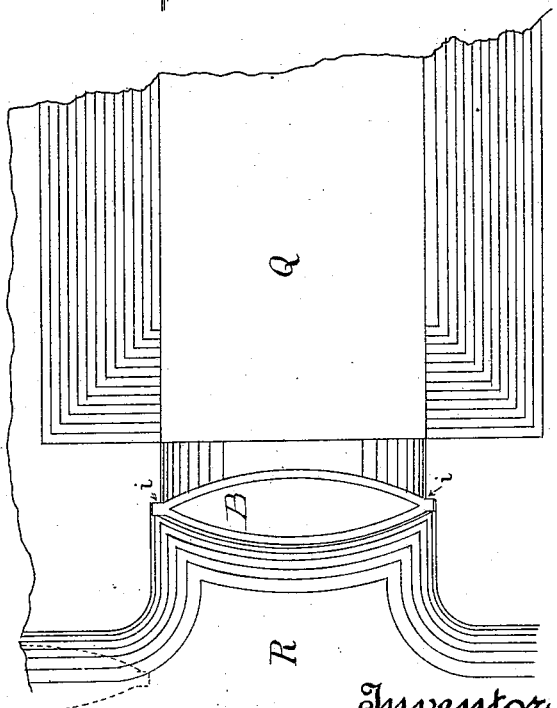

Referring to the accompanying drawings, Figure 1, Sheet 1, is a plan of a canal-lock with caisson-gate in position, closing the lock, the dotted lines indicating the place of caisson-gate when out of such position. Fig. 2 is an elevation of same. Fig. 3 is a plan of a dry-dock having the floating gate or caisson-gate in position across the entrance. Fig. 4 is an elevation of same. Fig. 5, Sheet 2, is an elevation and longitudinal section of my floating or caisson gate. Fig. 6, Sheet 3, is a midship cross-section of same. Figs. 7 and 8 represent the half-plans of the three decks, the upper deck, the between-decks, and the lower deck, respectively. Fig. 9 is a section through a square inlet valved opening, H, in the lower deck, showing, in elevation, the means for working the same. Fig. 10 is a horizontal section through one wicket-gate, G. Fig. 11 is an elevation of the wicket-gates G G'. Fig. 12 is a vertical section through the wicket-gates. Fig. 13 is a vertical section through the hoisting apparatus of the wicket-gates.

In the figures on Sheet 1 I show the application of my device to the purpose for which it is intended in order to clearly understand the manner of its operation.

In Figs. 1 and 2, L represents the lock, and K the canal. A B is the caisson-gate. (Shown across the entrance of the lock by firm lines, and swung around to open the entrance by dotted lines.) It is held against the entrance by being pressed up against shoulders $i$ made therein.

In Figs. 3 and 4, R is a river, and Q the dock. In Fig. 4 the caisson is shown by dotted lines to have been floated away to open the entrance to the dock.

In Fig. 5, Sheet 2, A is the gate-plate. It is constructed of iron sheets $a\ a$, running vertically, and connected and stiffened by I-beams $b\ b$ on each side. Around the edges of plate A are fastened on either side, by channel-irons $a^2$, a wooden piece, $a'$, which extends the whole length of the structure, and fits against the shoulders $i$ at the entrance of the dock. This plate is made of the same shape as the entrance, so as to effectually close it when lying across it.

B represents the floating body or buoy, constructed like a vessel, and having the three decks C D E, as shown in Fig. 5. Under the lower deck, E, is an air space or chamber, $e$, Fig. 6, Sheet 3. The shape of the bottom of this body is seen better in Figs. 6 and 9, Sheet 3. By not being flat it can have greater buoyancy with less bulk. The gate-plate A is properly secured to the body, so that the whole caisson-gate has the appearance of a vessel having an exceedingly deep keel. This construction of plate and body makes a device in which are united the results of the ordinary gates, and of the vessel-shaped caissons, being at the same time superior to both, as it produces a light and easily-handled device, one which can be operated to a better advantage than the ordinary gates, and is less clumsy than the usual caissons.

The means I use for handling or operating my device are as follows:

Upon each end of the body B, with their bases a little higher than the deck D, are situated water-tanks F, having in their bottoms outlets $f$, which may be suitably regulated by valves or cocks K. These water-tanks are high enough to keep their outlets above the surface of the water at any stage of the tide, and even when the device has been sunk to its limit, with the bottom of plate A resting on the bottom of the dock-entrance, so that by opening these outlets the contents of the water-tanks may escape. The floating-line W (seen in Fig. 6, Sheet 3) is a few inches below the lower deck, E. On a line with this deck E are four square valved openings, H H, two on each side. To sink the caisson-gate, water from suitable extraneous hydrants is allowed to flow into the water-tanks F. These hold enough to sink the caisson-gate so that its valved openings H are depressed below the level of the water which enters through the said valves, and, resting on the lower deck, E, soon sinks the caisson-gate until it rests upon the bottom of the dock-entrance. The valves to the openings H are closed after the water entering the same has by its pressure forced the gate down, they giving stability to the gate by retaining the water upon deck E in case of a fall of tide below its level or during a storm, the operating-levers of the valves being placed upon the upper deck in order to be accessible when the valves are submerged. To raise the caisson-gate again, open the outlets $f$, which, being above the level of the water, will allow the water which was confined in tanks F to run out into the other water on deck E. The device will then by its own buoyancy begin to rise while the water flows out through the valved openings H. By having the tanks F one at each end, the caisson-gate may be kept properly balanced, the railing being provided with water-levels for this purpose. When the caisson-gate is sunk, in order to fill the dock with water, I have the openings G', through the gate-plate A. These openings are covered by sliding wicket-gates G, one being on each side. By operating these gates, the water may be admitted to or excluded from the dock.

In Fig. 10, Sheet 3, I show the mechanism by which I operate the square valved openings H H. These valved openings consist of the frame $p$, riveted by means of flanges to the outside and deck plating, the valve or cover $r$, which is hinged to the upper part of the frame $p$, and has grooves for rubber packing, and a toothed quadrant, $q$, fastened to the back of the cover. This quadrant meshes with a worm-gear, $s$, keyed to a perpendicular spindle, $u$, resting in a tripod or step, $t$, on the lower deck, E. This spindle $u$, as seen in Fig. 6, reaches through the deck D, and has a hand-wheel, $v$, by which the valve may be opened or shut.

The wicket-gates G are double, (Figs. 11 and 13, Sheet 4,) one on each side of the plate A. These slide in guide-frames $g$ $g$, and are arranged one to go up and the other to go down, to uncover the opening G'. It is necessary to have a gate on each side in order to resist the pressure of the water, no matter from which side it may be.

The means for operating these gates are shown in Fig. 14. Attached to each gate are rods $w$. These enter the body B through pipes Y, Fig. 13, provided with stuffing-boxes, and reach to the between-decks, where they are connected by keys $y$ with racks $z$. These racks mesh with a pinion, Z, mounted in a frame, O. By this arrangement the wicket-gates opposite each other are counterpoised, and by turning the pinion Z by a crank one gate slides down while the other moves upward.

The same principle as herein explained may be followed in floating gates for locks or rivers and canals instead of those now in use. A much less draft being required when used for rivers and canals, one deck can be dispensed with, the number of wicket-gates may be increased, and the hoisting apparatus of the same placed on the upper deck.

The advantages this cassion-gate has are as follows: It requires neither pivots nor straps. It can be operated easily. The construction of the lock-chamber is simplified, requiring only shoulders or grooves for the gate and a recess to float the gate into while vessels are passing. The gate may be built where most convenient and floated to its destination. The lock can be filled through the numerous wicket-gates in a short time.

Having thus described my invention, what I claim as new, and desire to secure by Letters Patent, is—

1. A caisson or floating gate consisting of the plate A, having its bottom and ends shaped like and adapted to fit the entrance of the dock, lock, or harbor, the buoy or floating vessel or body B, secured to the top of the plate, the water-tanks F on each end of the body, and having outlets $f$ above the surface of the water, and suitable valved openings in said body near the water-line, to admit water when the cassion is depressed by the full tanks, and to allow its escape when the tanks are drained through the outlets, substantially as herein described.

2. A caisson or floating gate consisting of the plate A, having its bottom and ends shaped like and adapted to fit the entrance of the dock, lock, or harbor, the buoy or floating vessel or body B, having the lower water-deck, E, an air-chamber, e, under said deck, and valved openings H H on a line with said deck, and the water-tanks F on each end of the body, said tanks having outlets f above the surface of the water, substantially as herein described.

3. A caisson or a floating gate consisting of the plate A, for closing the entrance of the dock, lock, or harbor, the buoy or floating vessel B, having the lower water-deck, E, an air-chamber under said deck, valved openings H H, on a line with said deck, and means for closing said valved openings, consisting of the frame p, swinging cover r, toothed quadrant q, worm-gear s, and spindle u, substantially as herein shown and described.

4. In a caisson or floating gate, the plate A, having its bottom and ends shaped like and adapted to fit the entrance of the dock, lock, or harbor, and the body B, for floating and sinking said plate, in combination with the double wicket-gate G, covering on each side openings G' in said plate, and means for operating said gates, substantially as herein described.

5. In a caisson or floating gate, the plate A and floating body B, in combination with the wicket-gates G on each side of openings G' in said plate, and the means for operating said gates, consisting of the rods w, pipes Y, racks z, and pinion Z, all arranged and operating substantially as herein described.

In witness whereof I hereunto set my hand.

GEORGE F. SCHILD.

Witnesses:
   H. F. MALLETT,
   GEO. W. SIMONTON.